UNITED STATES PATENT OFFICE.

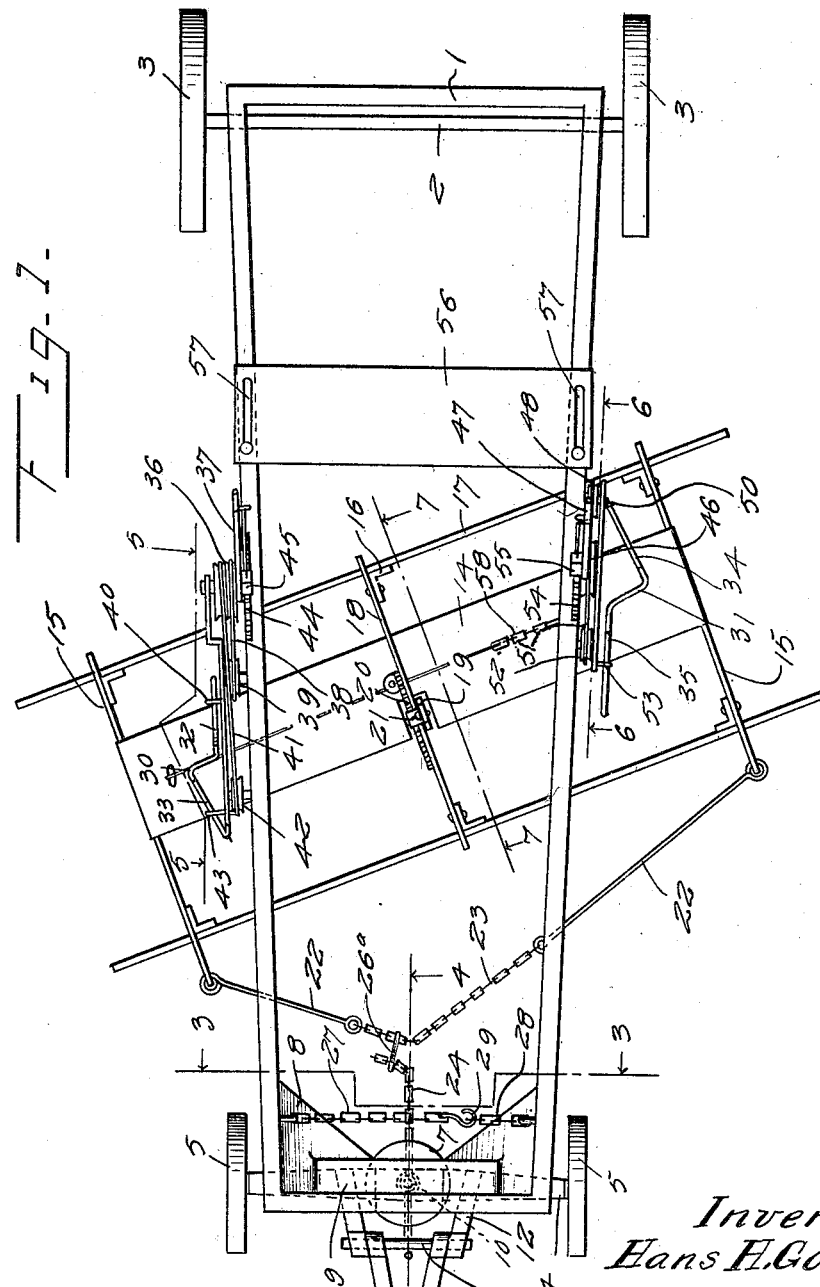

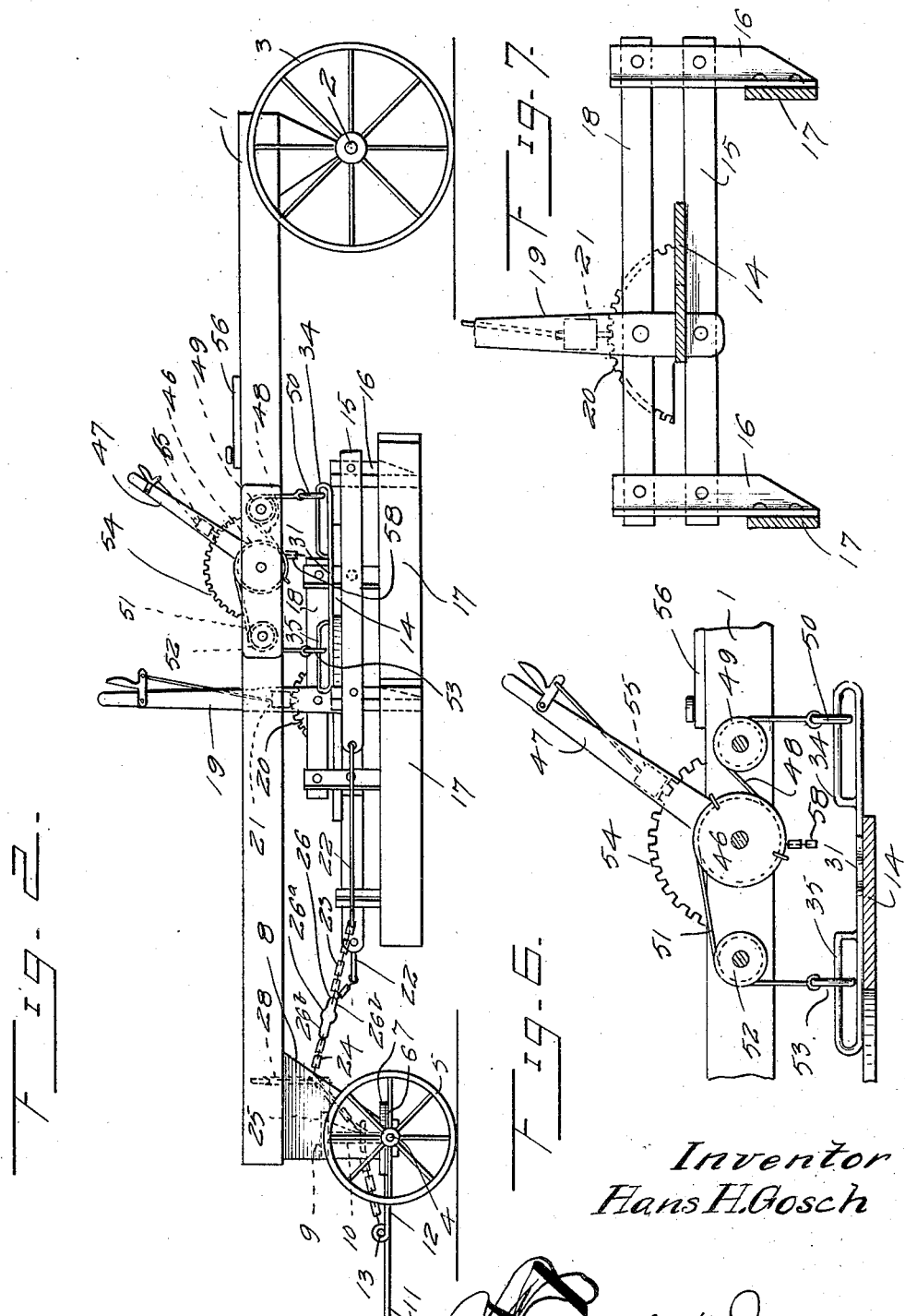

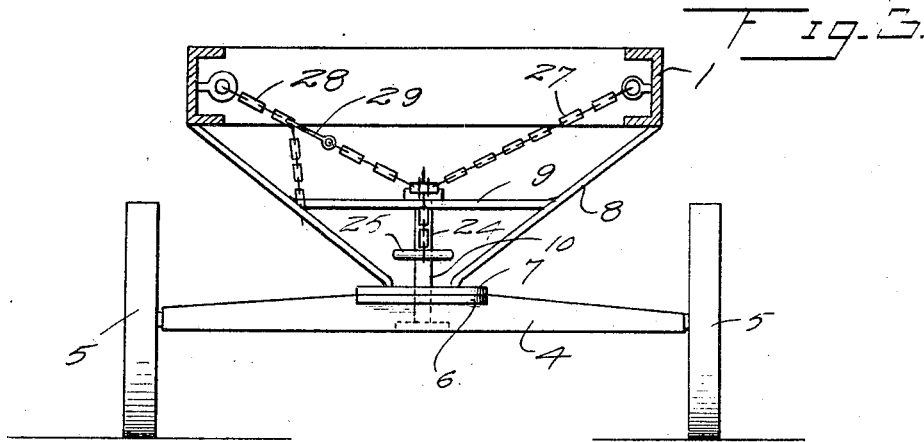
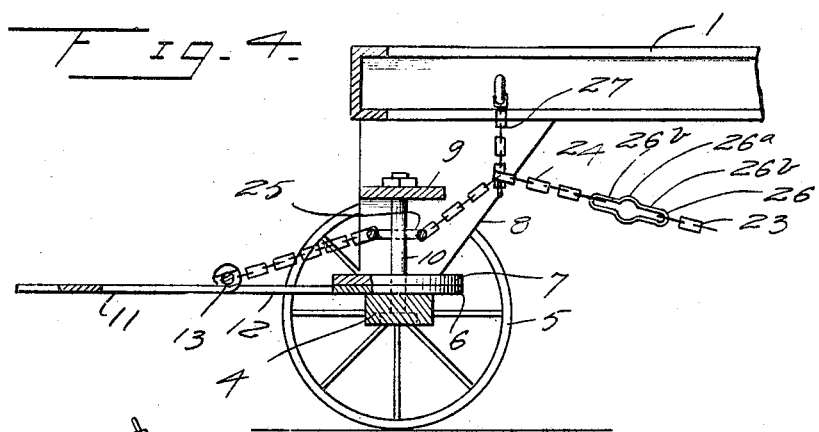
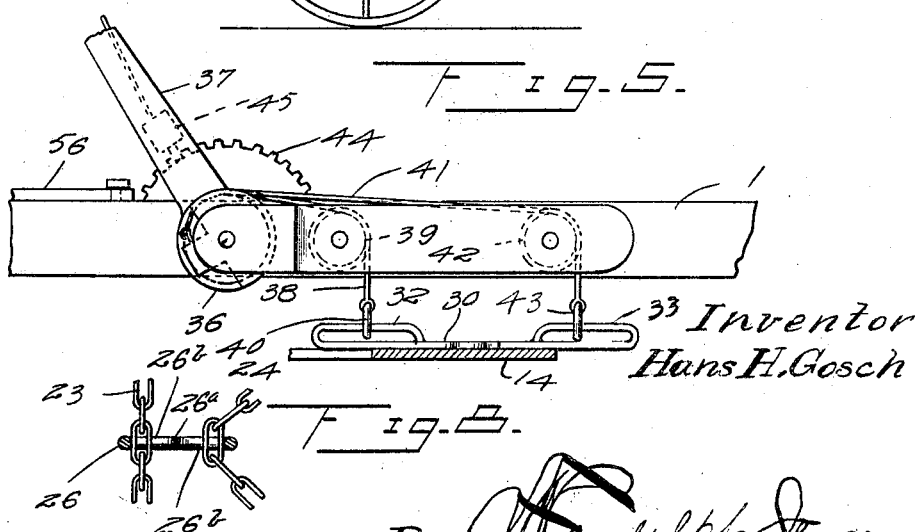

HANS HENRY GOSCH, OF RANDALL, MINNESOTA.

ROAD-DRAG.

1,373,236.　　　　　Specification of Letters Patent.　　Patented Mar. 29, 1921.

Application filed October 14, 1919. Serial No. 330,569.

*To all whom it may concern:*

Be it known that I, HANS HENRY GOSCH, a citizen of the United States, residing at Randall, in the county of Morrison and State of Minnesota, have invented certain new and useful Improvements in Road-Drags; and I do hereby declare the following to be a full, clear, and exact description of the invention, such as will enable others skilled in the art to which it appertains to make and use the same.

The invention relates to machines for improving the surfaces of roads and has for its object the provision of a wheeled truck having a drag supported thereby, with means for adjusting the angle of the drag relatively to the line of draft of the wheeled truck and also means to raise and lower the drag to regulate the depth of cut of the drag blades and to avoid obstacles on the road such as railroad crossings, etc.

The invention will be described in detail hereinafter and illustrated in the accompanying drawings, in which—

Figure 1 is a top plan view of my improved road drag;

Fig. 2, a side view;

Fig. 3, a sectional view on a plane indicated by the line 3—3 of Fig. 1, looking in the direction of the arrows;

Fig. 4, a sectional view on a plane indicated by the line 4—4 of Fig. 1, looking in the direction of the arrows;

Fig. 5, a sectional view on a plane indicated by the line 5—5 of Fig. 1, looking in the direction of the arrows;

Fig. 6, a sectional view on a plane indicated by the line 6—6 of Fig. 1, looking in the direction of the arrows;

Fig. 7, a sectional view on a plane indicated by the line 7—7 of Fig. 1, looking in the direction of the arrows; and Fig. 8, a detail view of the draft link for adjusting the angle of the drag frame.

Referring to the drawings in which similar reference characters indicate corresponding parts in the several views 1 indicates a truck frame having a rear axle 2 secured thereto on which is journaled rear wheels 3, and a front axle 4 on which is journaled front wheels 5 having a disk 6 that engages disk 7 connected to and supporting the front of frame 1 by means of inclined plates 8, 9 indicating a horizontal plate secured to inclined plates 8 and serving to brace said plates. 10 indicates a pin or bolt engaging front axle 4, disks 6 and 7 and horizontal plate 9 to secure them together and to permit rotation of axle 4 relatively to the front of the frame.

The draft pole 11 is pivotally secured between arms 12 extending forwardly from disk 6 by means of pin 13.

The drag frame consists of a plate 14 having bars 15 secured thereto and transversely thereof, and arms 16 pivotally mounted on the ends of said bars to which are secured the drag plates 17. Arms 16 opposite substantially the middle of plate 14 are extended upwardly and have a bar 18 pivotally secured to their extended portions. 19 indicates a lever pivotally secured to bar 18 and bar 15 thereunder and is utilized to adjust the angle of plates 17, said lever being held in adjusted position by means of a segmental rack 20 and latch 21.

Bars 15 are elongated forwardly of arms 16 on the front of the drag frame and have rods 22 pivotally secured thereto at one of their ends, the other ends of said rods being connected by a chain 23. 24 indicates a draft chain having a ring 25 secured thereto that engages pin or bolt 10, said chain 24 being secured to chain 23 by means of a link 26 having an enlarged middle portion 26$^a$ and narrow elongated ends 26$^b$. The enlarged portion 26$^a$ permits of adjusting the chains 23, 24 while the elongated ends 26$^b$ engage links of the chains to hold the chains in adjusted positions.

This structure and arrangement permits adjustment of the draft on the drag frame and also arrangement of the angle of the drag plates 17 relatively to the line of draft for the most effective operation of the machine.

27 and 28 indicate chains secured to the side beams of frame 1 and secured together by a hook 29 on the end of chain 27 engaging one of the links in chain 28, said chains when connected supporting chain 24 and by adjusting the tension of the chains 27, 28 the draft applied to the drag frame may be applied in an upwardly, a downwardly or on a horizontal plane as may be desired.

Secured to plate 14 and adjacent its ends are rods 30 and 31, each of said rods having its middle portion extended substantially parallel with the sides of plate 14. The rear portion of rod 30 extends at an obtuse angle to the middle portion heretofore described as shown in Fig. 1 and is bent back on itself to form an elongated loop 32 while the front portion of the rod extends at an acute angle to the middle portion and is bent back on itself to form a loop 33. Rod 31 has a rear portion extending at an acute angle to the middle portion and bent back to form a loop 34 substantially parallel to loop 33, while the front portion of the rod extends at an obtuse angle to the middle portion and bent back to form a loop 35 that is substantially parallel with loop 32.

Journaled on one of the side bars of frame 1 is a drum 36 and secured to the drum a lever 37 for actuating it, said drum having two grooves and two cables secured thereto one in each groove; cable 38 running over a sheave 39 and having a ring 40 loosely mounted in loop 32, and cable 41 running over sheave 42 and having a ring 43 loosely mounted in loop 33. 44 indicates a segmental rack on frame 1 and 45 a latch to engage said rack to hold the lever 37 and drum 36 in adjusted positions. Journaled on the other side of frame 1 is another drum 46 and secured to the drum a lever 47 for actuating it, said drum having but a single groove with two cables secured in the one groove on opposite sides of the center of the drum; one of the cables 48 extending rearwardly and running over a sheave 49 and having a ring 50 secured thereto that is loosely mounted in loop 34, while the other cable 51 extends over a sheave 52 in front of the drum and has a ring 53 loosely mounted in loop 35. 54 indicates a segmental rack secured to frame 1 and 55 a latch on lever 47 engaging said rack to hold said lever in adjusted positions.

56 indicates a platform for the operator that is slotted transversely adjacent its ends as shown at 57 to permit adjustment thereof on frame 1.

The arrangement of the drum 36 and sheaves 39 and 42 on one side of frame 1 and drum 46 and sheaves 49 and 52 on the other side of the frame provides for placing both levers 37 and 47 for easy manipulation by the operator on platform 56, the operation of rotating said drums 36 and 46 being accomplished simultaneously when it is desired to lift the drag from the roadway to pass over obstacles or when transporting the machine from place to place.

The arrangements of the angularity of loops 32, 33, 34 and 35 is to provide for adjusting the drag frame by means of chain 23 in draft link 26, the movement of the drag frame on such adjustment being substantially circular.

To overcome the tendency of the drag frame moving sidewise I employ a flexible member, such as a cable or chain 58, that is secured to the left hand side of frame 1, and adjacent the right hand end of plate 14.

Having thus described the invention what is claimed is:—

1. In a road drag, a wheeled frame, a drag frame, said drag frame having rods secured thereto and bent back on their ends to form loops, said loops arranged angularly to the sides of said drag frame, the front and rear loops on opposite ends of the frame being substantially parallel to one another, and means mounted on said wheeled frame and engaging said loops to hold the drag frame in adjusted positions relatively to the wheeled frame.

2. In a road drag, a wheeled frame, a drag frame, said drag frame having rods secured thereto and bent back on their ends to form loops, said loops arranged angularly to the sides of said drag frame, the front and rear loops on opposite ends of the frame being substantially parallel to one another, a drum journaled on each side of the wheeled frame, and cables secured to said drums and engaging said loops to adjust the height of the drag frame relatively to the wheeled frame.

In testimony whereof I affix my signature in presence of two witnesses.

HANS HENRY GOSCH.

Witnesses:
A. T. KULL,
RALPH S. RAYMOND.